United States Patent [19]

Yasukawa et al.

[11] 4,295,561
[45] Oct. 20, 1981

[54] CONVEYOR WITH SCRAPERS

[76] Inventors: Masaru Yasukawa; Soji Yasukawa, both of 122, Sanmaidencho, Tenrishi, Nara, Japan

[21] Appl. No.: 816,756

[22] Filed: Jul. 18, 1977

[51] Int. Cl.³ .............................. B65G 19/28
[52] U.S. Cl. .................................. 198/735
[58] Field of Search ............... 198/727, 733, 735, 747, 198/749, 841, 860, 861, 723

[56] References Cited

U.S. PATENT DOCUMENTS

| 1,845,066 | 2/1932 | Walter | 198/735 |
| 2,519,970 | 8/1950 | Lang | 198/735 |
| 2,536,950 | 1/1951 | Long et al. | 198/733 |
| 2,951,579 | 9/1960 | Stauth et al. | 198/735 |
| 3,140,775 | 7/1964 | Asher | 198/727 |
| 3,472,556 | 10/1969 | Bolton | 198/733 |
| 3,493,099 | 2/1970 | Fink | 198/723 |

FOREIGN PATENT DOCUMENTS

| 2040678 | 2/1972 | Fed. Rep. of Germany | 198/735 |
| 2548018 | 4/1977 | Fed. Rep. of Germany | 198/735 |
| 1035243 | 8/1953 | France | 198/860 |

Primary Examiner—Joseph E. Valenza
Attorney, Agent, or Firm—Eyre, Mann, Lucas & Just

[57] ABSTRACT

This invention provides a conveyor with scrapers for transporting and disposing of machining refuse, the conveyor consisting of a required number of chutes each of which is constructed to be portable and handy.

4 Claims, 5 Drawing Figures

U.S. Patent    Oct. 20, 1981    4,295,561
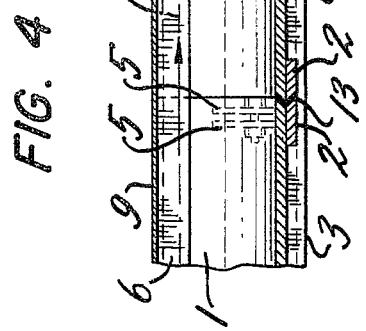
FIG. 4
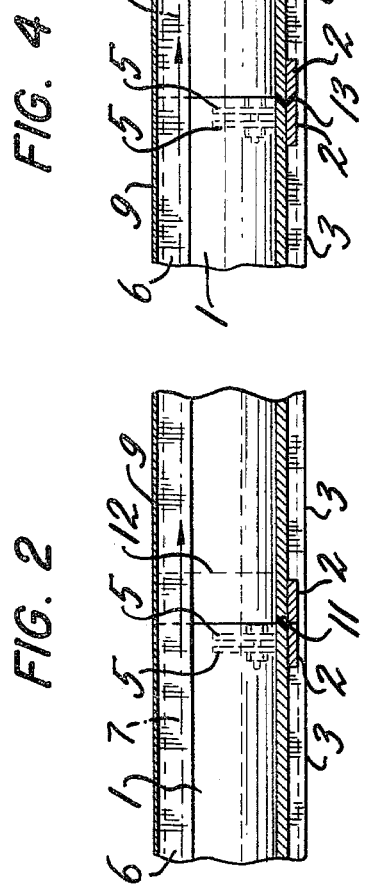
FIG. 2
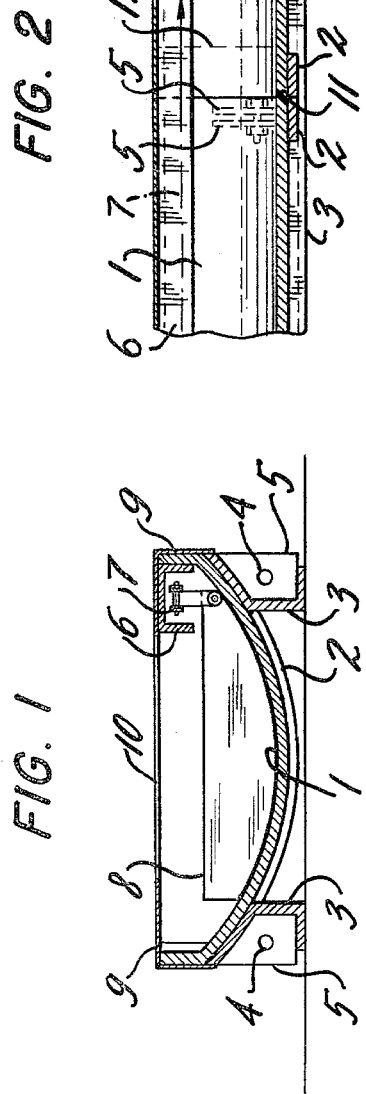
FIG. 1
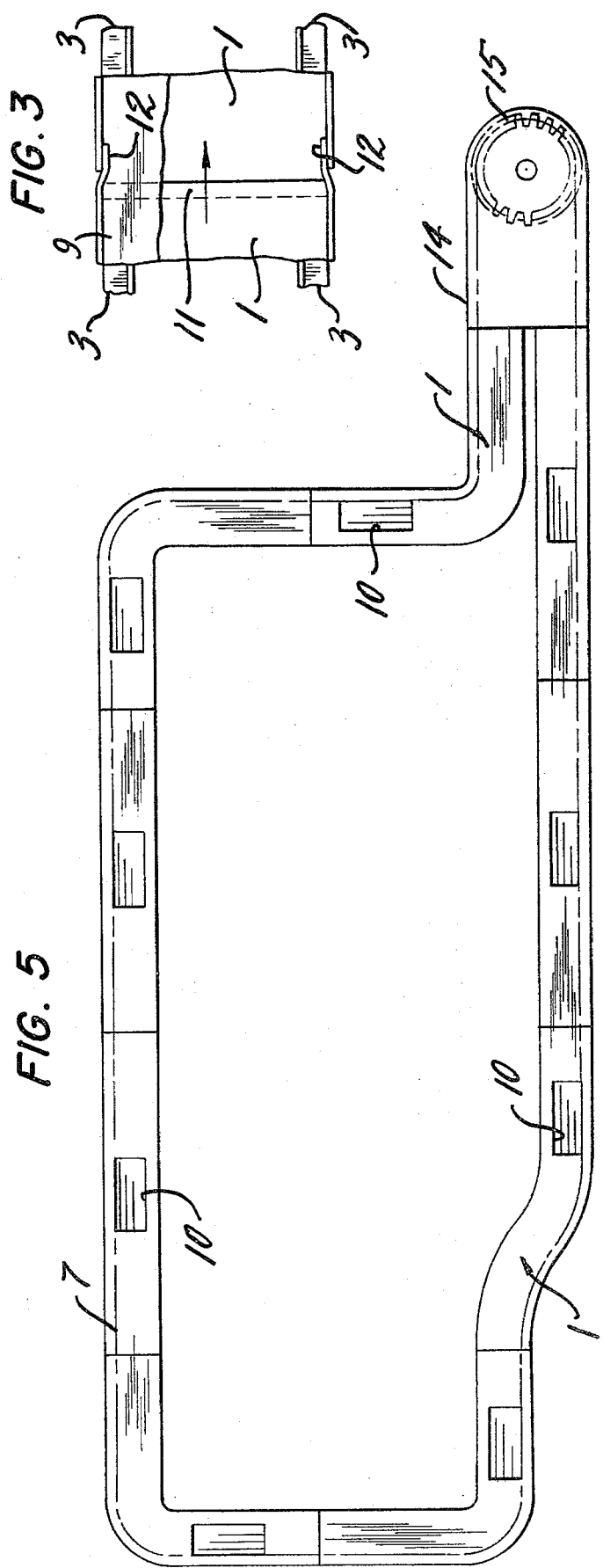
FIG. 3
FIG. 5

CONVEYOR WITH SCRAPERS

The present invention relates to a conveyor for use in transporting machining refuse produced as a result of operating a machine tool, such as lathes, drills, planers. More particularly, the present invention is directed to a conveyor which is used for transporting and disposing of machining refuse wherein the conveyor consists of a required number of chutes assembled on the spot, the chutes being prefabricated so as to meet the requirements of the site.

In conventional manners pits are previously excavated around the machines to place conveyors in, which requires a lot of labour and time. In addition, if the machine tools are moved from place to place the old pits must be filled and new pits be excavated to rearrange the conveyors. This repairing work is also costly and toilsome.

The present invention aims at solving the problems mentioned above, and provides an improved conveyor consisting of a required number of chutes assemblable at the site where the conveyor is to be built, the conveyor being adapted for construction on the floor.

The invention will be more particularly described by way of example with reference to the drawing, in which:

FIG. 1 is a vertical cross-section through a conveyor embodying the present invention;

FIG. 2 is a longitudinal cross-section of a part of the conveyor particularly showing the connection of adjacent two chutes;

FIG. 3 is a plan view of the part shown in FIG. 2;

FIG. 4 is a longitudinal cross-section of a modified version of the embodiment;

FIG. 5 is a plan view of the conveyor in its complete form.

Referring to FIG. 1 a chute 1 is shaped like a vessel having a semi-circular bottom, which is backed by underlaid bands 2 at both ends. The bottom of the chute is supported by a pair of angle bars 3, which are secured to the bottom of the chute 1 e.g. by welding. The angle bar 3 is provided with flanges 5 at both ends, each flange being provided with an aperture 4 for passing a connecting bolt. The chute 1 has upright side walls continuous to the semi-circular bottom, and a channel bar 6 is jointed to either of the side walls, such that the opening of the channel is faced to the inner side of the semi-circular bottom, as best illustrated in FIG. 1. Inside the channel bar 6 endless chains 7 are accommodated with scrapers 8 provided at appropriate intervals. The chute 1 is covered by a covering 9, which has a hole 10 for throwing the refuse through. The terminating edges of each bottom have slant end faces 11, as shown in FIG. 2, so as to obtain an increased joint area, which will be helpful in connecting adjacent two chutes 1.

One of the upright side walls is preferably bent inwards at its terminating end, as shown in FIG. 3, which facilitates to joint the adjacent two side walls; reference numeral 12 indicates the bent portion of the upright aide walls.

To construct a long range of conveyor the chutes are connected by fastening adjacent two flanges 5 by means of bolts and nuts, wherein the slant end faces of the adjacent chutes are placed in abutment with each other. When a required number of chutes have been connected, endless chains 7 are equipped in the channels 6. The endless chains are driven by the driving section 14 through a sprocket 15. Advantageously the chute can be fabricated variously in form, such as straight, arch-like, rectangular, so that the range of conveyor may be built to meet the requirements of the site. An example is shown in FIG. 5.

FIG. 4 illustrates a modified version of the embodiment in which a packing 13 is interposed in the joint of the adjacent bottoms; prefereably the packing 13 covers the joint of the underlaid bands 2, thereby preventing a cutting oil contained in the disposing refuse from leaking through the joint.

When the abutting faces of the bottoms are slanted, it is preferred that the scrapers 8 are kept free from the seams between the abutted bottoms, so as to enable the same to run smoothly on the conveyor. It is preferred therefore that the terminating end faces of each bottom are slanted opposedly to the advancing direction of the scrapers as shown in FIGS. 2 and 4, in which the advancing direction of the scraper is indicated by an arrow. In contrast, the abutting faces of the underlaid bands 2 can be slanted in the same direction as the advancing direction of the scraper, so that the joints as a whole can form a zigzag form in cross-section, as shown in FIG. 4, in which a packing 13 is inserted in this zigzag joint.

What is claimed is:

1. A conveyor disposed adjacent a machine tool comprising a plurality of interconnected chutes for transporting machining refuse, said chutes in combination comprising a channel-like vessel having upright side walls, a concave bottom extended therebetween at the lower end and a cover extended therebetween at the upper end, said cover having a plurality of spaced openings therein through which said refuse may be introduced to said chutes, supporting bases for said vessel affixed to the exterior of said concave bottom, said supporting bases including means for connecting adjacent chutes, guide means for supporting an endless chain interconnecting all of said chutes, said guide means being secured to one of said upright walls, and said guide means being a channel bar positioned about said endless chain with its opening facing downward, a plurality of spaced scrapers affixed to said endless chain for moving said refuse in said chutes, each said scraper having a configuration substantially the same as the configuration of the bottom portion of said chutes, drive means for said endless chain to continuously move it in one direction, the end faces at the interface between adjacent interconnected chutes being slanted opposedly to the advancing direction of said scrapers, underlaid supporting bands at each end of each chute positioned to abut the underlaid bands of each adjacent chute, the end faces at the interface between adjacent underlaid bands being slanted in the same direction as the advancing direction of said scrapers, whereby each end of each chute has a V-shaped configuration which cooperatively engages with the opposed V-shaped end of the next adjacent chute.

2. A conveyor as claimed in claim 1, wherein the means for connecting adjacent chutes is a flange secured to said supporting base, said flange being provided with an aperture for passing a connecting bolt through.

3. A conveyor as claimed in claim 1, wherein a packing is interposed to cover both joints of said bottoms and said underlaid bands.

4. The conveyor of claim 1 wherein the said chutes are interconnected in the form of a closed loop.

* * * * *